(12) United States Patent
Fairhurst et al.

(10) Patent No.: US 10,313,690 B2
(45) Date of Patent: Jun. 4, 2019

(54) SYSTEMS AND METHODS FOR REDUCING ARTIFACTS IN TEMPORAL SCALABLE LAYERS OF VIDEO

(71) Applicant: Sharp Kabushiki Kaisha, Sakai (JP)

(72) Inventors: Jon Arthur Fairhurst, Camas, WA (US); Christopher Andrew Segall, Vancouver, WA (US); Sachin G. Deshpande, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 28 days.

(21) Appl. No.: 15/288,926

(22) Filed: Oct. 7, 2016

(65) Prior Publication Data

US 2017/0105013 A1    Apr. 13, 2017

Related U.S. Application Data

(60) Provisional application No. 62/239,232, filed on Oct. 8, 2015.

(51) Int. Cl.

| H04N 19/19 | (2014.01) |
|---|---|
| H04N 19/196 | (2014.01) |
| H04N 19/117 | (2014.01) |
| H04N 19/187 | (2014.01) |
| H04N 19/31 | (2014.01) |
| H04N 19/587 | (2014.01) |
| H04N 19/85 | (2014.01) |
| H04N 19/126 | (2014.01) |

(Continued)

(52) U.S. Cl.
CPC ......... *H04N 19/198* (2014.11); *H04N 19/117* (2014.11); *H04N 19/126* (2014.11); *H04N 19/172* (2014.11); *H04N 19/187* (2014.11); *H04N 19/31* (2014.11); *H04N 19/587* (2014.11); *H04N 19/59* (2014.11); *H04N 19/85* (2014.11)

(58) Field of Classification Search
CPC .. H04N 19/198; H04N 19/172; H04N 19/126; H04N 19/59
See application file for complete search history.

(56) References Cited

U.S. PATENT DOCUMENTS 6,728,317 B1 * 4/2004 Demos ..................... H04N 5/14
                                                        348/E5.108
8,111,754 B1 * 2/2012 Demos .................. H04N 19/61
                                                        375/240.16

(Continued)

FOREIGN PATENT DOCUMENTS

| EP | 1959683 A2 | 8/2008 |
| WO | 2015/076277 A1 | 5/2015 |

OTHER PUBLICATIONS

International Search Report and Written Opinion for PCT/US2016/056153 dated Dec. 19, 2016, 11 pp.

*Primary Examiner* — Neil R Mikeska
(74) *Attorney, Agent, or Firm* — Keating & Bennett, LLP

(57) ABSTRACT

A device may be configured to receive video data including a sequence of frames. The sequence of video frames may have a high frame rate. A high frame rate may include frame rate of 120 Hz or higher. In one example, for every other frame included in the sequence of frames, the device may generate a modified frame. A modified frame may include a frame based on a weighted average of a current frame and a previous frame.

20 Claims, 9 Drawing Sheets

(51) Int. Cl.
*H04N 19/172* (2014.01)
*H04N 19/59* (2014.01)

(56) References Cited

U.S. PATENT DOCUMENTS

| | | | |
|---|---|---|---|
| 2003/0112871 A1* | 6/2003 | Demos | H04N 19/51 375/240.15 |
| 2004/0005004 A1* | 1/2004 | Demos | H04N 19/147 375/240.08 |
| 2004/0036800 A1 | 2/2004 | Ohki | |
| 2008/0247462 A1* | 10/2008 | Demos | H04N 19/597 375/240.03 |
| 2009/0268823 A1* | 10/2009 | Dane | H04N 19/61 375/240.27 |
| 2010/0061648 A1* | 3/2010 | Wong | G06T 5/20 382/260 |
| 2015/0146096 A1* | 5/2015 | Nakatani | H04N 5/144 348/441 |

* cited by examiner

SYSTEMS AND METHODS FOR REDUCING ARTIFACTS IN TEMPORAL SCALABLE LAYERS OF VIDEO

RELATED APPLICATIONS

This application claims the benefit of U.S. Provisional Application No. 62/239,232, filed on Oct. 8, 2015, which is incorporated by reference in its entirety.

TECHNICAL FIELD

This disclosure relates to video coding and more particularly to techniques for temporal scalability.

BACKGROUND

Digital video capabilities can be incorporated into a wide range of devices, including digital televisions, including so-called smart televisions, laptop or desktop computers, tablet computers, digital recording devices, digital media players, video gaming devices, cellular telephones, including so-called "smart" phones, medical imaging devices, and the like. Digital video may be coded according to a video coding standard. Examples of video coding standards include ISO/IEC MPEG-4 Visual and ITU-T H.264 (also known as ISO/IEC MPEG-4 AVC) and High-Efficiency Video Coding (HEVC), ITU-T H.265 and ISO/IEC 23008-2 MPEG-H. Extensions and improvements for HEVC are currently being developed. For example, the Video Coding Experts Group (VCEG) designates certain topics as Key Technical Areas (KTA) for further investigation. Techniques developed in response to KTA investigations may be included in future video coding standards, (e.g., "H.266"). Video coding standards may incorporate video compression techniques.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of frames within a video sequence, a frame within a group of frames, slices within a frame, coding tree units (or macroblocks) within a slice, coding blocks within a coding tree unit, coding units within a coding block, etc.). Spatial techniques (i.e., intra-frame coding) and/or temporal techniques (i.e., inter-frame coding) may be used to generate a difference value between a coding unit to be coded and a reference coding unit. The difference value may be referred to as residual data. Residual data may be coded as quantized transform coefficients. Syntax elements (e.g., reference picture indices, motion vectors, and block vectors) may relate residual data and a reference coding unit. Residual data and syntax elements may be entropy coded.

Video coding standards may support temporal scalability. That is, video coding standards may enable a bitstream of encoded video data to be decoded at different frame (or picture) rates (e.g., 60 Hz or 120 Hz). For example, HEVC describes a sub-bitstream extraction process where encoded video frames within a sequence of encoded video data include respective temporal identifiers such that a particular subset of encoded video frames can be extracted for decoding. The extracted frames may be decoded and used to provide output video with a lower frame rate than the frame rate of the original sequence of encoded video data. However, the output video with a lower frame rate may include motion based artifacts.

SUMMARY

In general, this disclosure describes various techniques for temporal scalability. In particular, this disclosure describes techniques for modifying a sequence of video data having a particular frame rate (e.g., 120 Hz) in order to improve the quality of a lower frame rate (e.g., 60 Hz) extracted sequence of video data. It should be noted that a frame or picture rate may be specified in Hertz (Hz) or frames per second (fps). The techniques described herein may be used to compensate for motion based artifacts that may occur in video when a lower frame rate sub-layer is extracted from a higher frame rate layer. It should be noted that although techniques of this disclosure, in some examples, are described with respect to the ITU-T H.264 standard and the ITU-T H.265 standard, the techniques of this disclosure are generally applicable to any video coding standard, including video coding standards currently under development (e.g., "H.266"). Further, it should be noted that incorporation by reference of documents herein is for descriptive purposes and should not be constructed to limit and/or create ambiguity with respect to terms used herein. For example, in the case where one incorporated reference provides a different definition of a term than another incorporated reference and/or as the term is used herein, the term should be interpreted in a manner that broadly includes each respective definition and/or in a manner that includes each of the particular definitions in the alternative.

In one example, a method of modifying video data comprises receiving video data including a sequence of frames, for every N frame included in the sequence of frames, generating a modified frame, replacing every N frame included in the sequence of frames with a corresponding modified frame to generate a modified sequence of frames, and outputting video data including the modified sequence of frames.

In one example, a device for modifying video data comprises one or more processors configured to receive video data including a sequence of frames, for every N frame included in the sequence of frames, generate a modified frame, replace every N frame included in the sequence of frames with a corresponding modified frame to generate a modified sequence of frames, and output video data including the modified sequence of frames.

In one example, a non-transitory computer-readable storage medium comprises instructions stored thereon that, when executed, cause one or more processors of a device for coding video data to receive video data including a sequence of frames, for every N frame included in the sequence of frames, generate a modified frame, replace every N frame included in the sequence of frames with a corresponding modified frame to generate a modified sequence of frames, and output video data including the modified sequence of frames.

In one example, an apparatus for modifying video data comprises means for receiving video data including a sequence of frames, means for generating a modified frame for every N frame included in the sequence of frames, means for replacing every N frame included in the sequence of frames with a corresponding modified frame to generate a modified sequence of frames, and means for outputting video data including the modified sequence of frames.

In one example, a method of reconstructing modified video data comprises receiving video data including a sequence of frames, wherein every N frame includes a modified frame, for every N frame included in the sequence of frames, generating a reconstructed frame, replacing every N frame included in the sequence of frames with a corresponding reconstructed frame to generate a sequence of frames, and outputting video data including the sequence of frames.

In one example, a device for reconstructing modified video data comprises one or more processors configured to receive video data including a sequence of frames, wherein every N frame includes a modified frame, for every N frame included in the sequence of frames, generate a reconstructed frame, replace every N frame included in the sequence of frames with a corresponding reconstructed frame to generate a sequence of frames, and output video data including the sequence of frames.

In one example, a non-transitory computer-readable storage medium comprises instructions stored thereon that, when executed, cause one or more processors of a device to receive video data including a sequence of frames, wherein every N frame includes a modified frame, for every N frame included in the sequence of frames, generate a reconstructed frame, replace every N frame included in the sequence of frames with a corresponding reconstructed frame to generate a sequence of frames, and output video data including the sequence of frames.

In one example, an apparatus comprises means for receiving video data including a sequence of frames, wherein every N frame includes a modified frame, means for generating a reconstructed frame for every N frame included in the sequence of frames, means for replacing every N frame included in the sequence of frames with a corresponding reconstructed frame to generate a sequence of frames, and means for outputting video data including the sequence of frames.

The details of one or more examples are set forth in the accompanying drawings and the description below. Other features, objects, and advantages will be apparent from the description and drawings, and from the claims.

DETAILED DESCRIPTION

Digital video may be encoded according to a video coding standard. One example video coding standard includes High-Efficiency Video Coding (HEVC), ITU-T H.265 and ISO/IEC 23008-2 MPEG-H, which is described in ITU-T, "High Efficiency Video Coding," Recommendation ITU-T H.265 (10/2014), which is incorporated by reference in its entirety. Video content typically includes video sequences comprised of a series of frames. A series of frames may also be referred to as a group of pictures (GOP). Each video frame or picture may include a plurality of slices, where a slice includes a plurality of video blocks. A video block may be defined as the largest array of pixel values (also referred to as samples) that may be predictively coded. As used herein, the term video block may refer at least to the largest array of pixel values that may be predictively coded, sub-divisions thereof, and/or corresponding structures. Video blocks may be ordered according to a scan pattern (e.g., a raster scan). A video encoder may perform predictive encoding on video blocks and sub-divisions thereof. HEVC specifies a coding tree unit (CTU) structure where a picture may be split into CTUs of equal size and each CTU may include coding tree blocks (CTB) having 16×16, 32×32, or 64×64 luma samples. An example of partitioning a group of pictures into CTBs is illustrated in FIG. 1.

Figure 1:
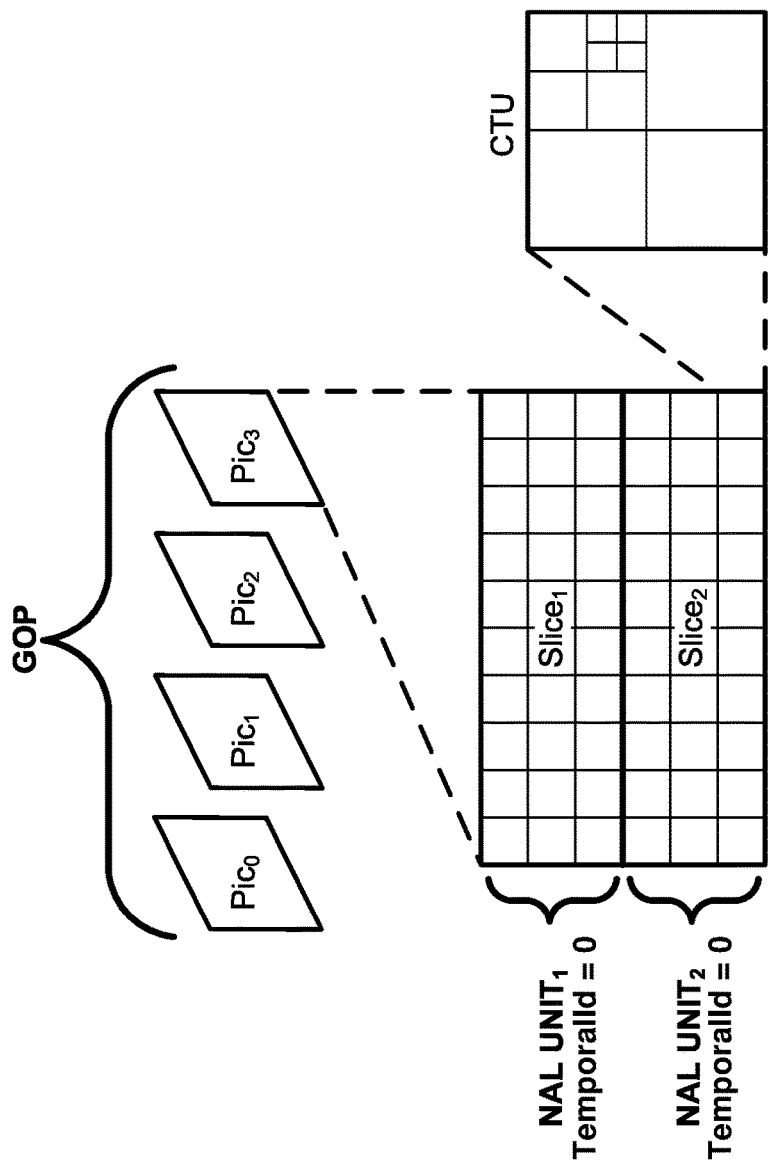
FIG. 1 is a conceptual diagram illustrating an example of a group of pictures coded according to predictive video coding techniques.
Figure 2:
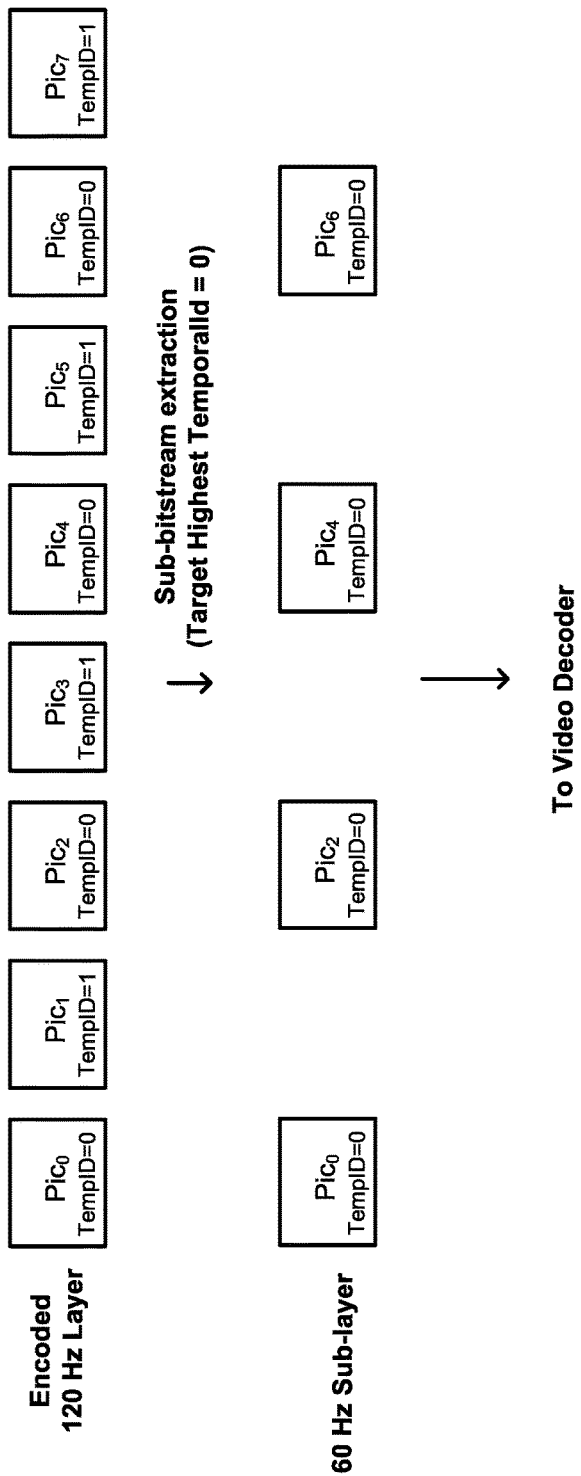
FIG. 2 is a conceptual diagram illustrating an example of a sub-bitstream extraction process according to predictive video coding techniques.

As illustrated in FIG. 1, a group of pictures (GOP) includes pictures $Pic_0$-$Pic_3$. In the example illustrated in FIG. 1, $Pic_3$ is partitioned into $slice_1$ and $slice_2$, where each of $slice_1$ and $slice_2$ include consecutive CTUs according to a left-to-right top-to-bottom raster scan. In HEVC, each slice may be associated with a video coding layer (VCL) network abstraction layer (NAL) unit (i.e., a VCL NAL unit). In the example illustrated in FIG. 1, $slice_1$ is associated with NAL $Unit_1$ and $slice_2$ is associated with NAL Unite. HEVC supports multi-layer extensions, including format range extensions (RExt), scalability extensions (SHVC), and multi-view extensions (MV-HEVC). Scalability extensions may include temporal scalability. In HEVC to support temporal scalability each VCL NAL unit may be associated with a temporal identifier (i.e., a TemporalId variable in HEVC). HEVC defines a sub-bitstream extraction process where NAL units in a bitstream that do not belong to a target set, as determined by a target highest TemporalId and a target layer identifier list, are removed from the bitstream, with the output sub-bitstream consisting of the NAL units in the bitstream that belong to the target set. FIG. 2 is a conceptual diagram illustrating an example of a sub-bitstream extraction process.

In the example illustrated in FIG. 2, an example encoded layer of video data having a frame rate of 120 Hz includes $Pic_0$-$Pic_7$, where $Pic_0$, $Pic_2$, $Pic_4$, and $Pic_6$ include VCL NAL units (i.e., slices) associated with a TemporalId of 0 and where $Pic_1$, $Pic_3$, $Pic_5$, and $Pic_7$ include VCL NAL units (i.e., slices) associated with a TemporalId of 1. In the example illustrated in FIG. 2, a target highest TemporalId of 0 is provided for sub-bitstream extraction. That is, $Pic_1$, $Pic_3$, $Pic_5$, and $Pic_7$ are extracted prior to decoding. In this manner, an encoded bitstream of video having a frame rate 120 Hz is reduced to sub-bitstream of video having a frame rate of 60 Hz video prior to decoding. A video decoder may receive the sub-bitstream and decode and output video having a frame rate of 60 Hz.

Typically, when a video sequence is captured at a particular frame rate, a shutter interval is selected based on the frame rate in order to provide crisp images with acceptable strobing. That is, images without perceivable motion blur or judder. For example, video captured at 120 Hz may have been captured with a 50% (i.e., 180 degree) shutter interval (i.e., 1/240 seconds for a 120 Hz frame rate). Depending on the motion of objects within the video, this shutter interval may provide crisp images with acceptable strobing. In this example, if every other frame is extracted from the captured video to create video having a 60 Hz frame rate, the shutter interval remains 1/240 seconds and the 60 Hz video will effectively only have a 25% (90 degrees) shutter interval. This effective shutter interval may cause motion based artifacts (e.g., visible strobing) when the 60 Hz video is decoded and output to a display. Thus, the sub-bitstream extraction process described in HEVC, as well as other conventional temporal scalability techniques, may not compensate for non-ideal shutter intervals for each scalable frame rate. As described in greater detail below, the techniques described herein may be used to compensate for non-ideal shutter intervals for an extracted lower frame rate video and thereby reduce motion based artifacts.

It should be noted that for video captured at a particular frame rate, a shutter interval may be selected in order to reduce motion based artifacts in a video sequence generated by sub-bitstream extraction, however, as described below, this may result in a reduction of video quality when sub-bitstream extraction does not occur (e.g., the video is decoded and output at the highest available frame rate). For example, a video may be captured at a frame rate of 120 Hz with a 100% (i.e., 360 degree) shutter interval (i.e., 1/120 seconds), in order for a 60 Hz extracted video sequence to have an effective 50% (i.e., 180 degree) shutter interval. In this case, the 120 Hz video may not gain any crispness or clarity over the lower frame rate version. In another example, a video may be captured at 120 Hz with a 75% (270 degree) shutter interval (1/160 seconds). In this example, the effective shutter angle of a 60 Hz extracted video would be 37.5% (i.e., 135 degrees). This example represents a compromise between the two frame rate versions of video and may somewhat mitigate a strobing effect in a 60 Hz video sequence and any excess motion blur in a 120 Hz video sequence, but neither video sequence would have ideal qualities. As described in detail below the techniques described herein may mitigate motion artifacts (e.g., strobing effects) in a lower frame rate video sequence generated using sub-bitstream extraction while preserving the qualities of a corresponding higher frame rate video sequence. It should be noted that although the examples described herein are described with respect to frame rates of 120 Hz and 60 Hz, the techniques described herein may be generally applicable to various scalable frame rates (e.g., 24 Hz, 30 Hz, 40 Hz, 48 Hz, 60 Hz, 120 Hz, 240 Hz, etc.). Further, a reduced frame rate may include other fractional frame rates (¼, ⅓, ⅔, ¾, etc.) in additional to a ½ fractional frame rate.

Figure 3:
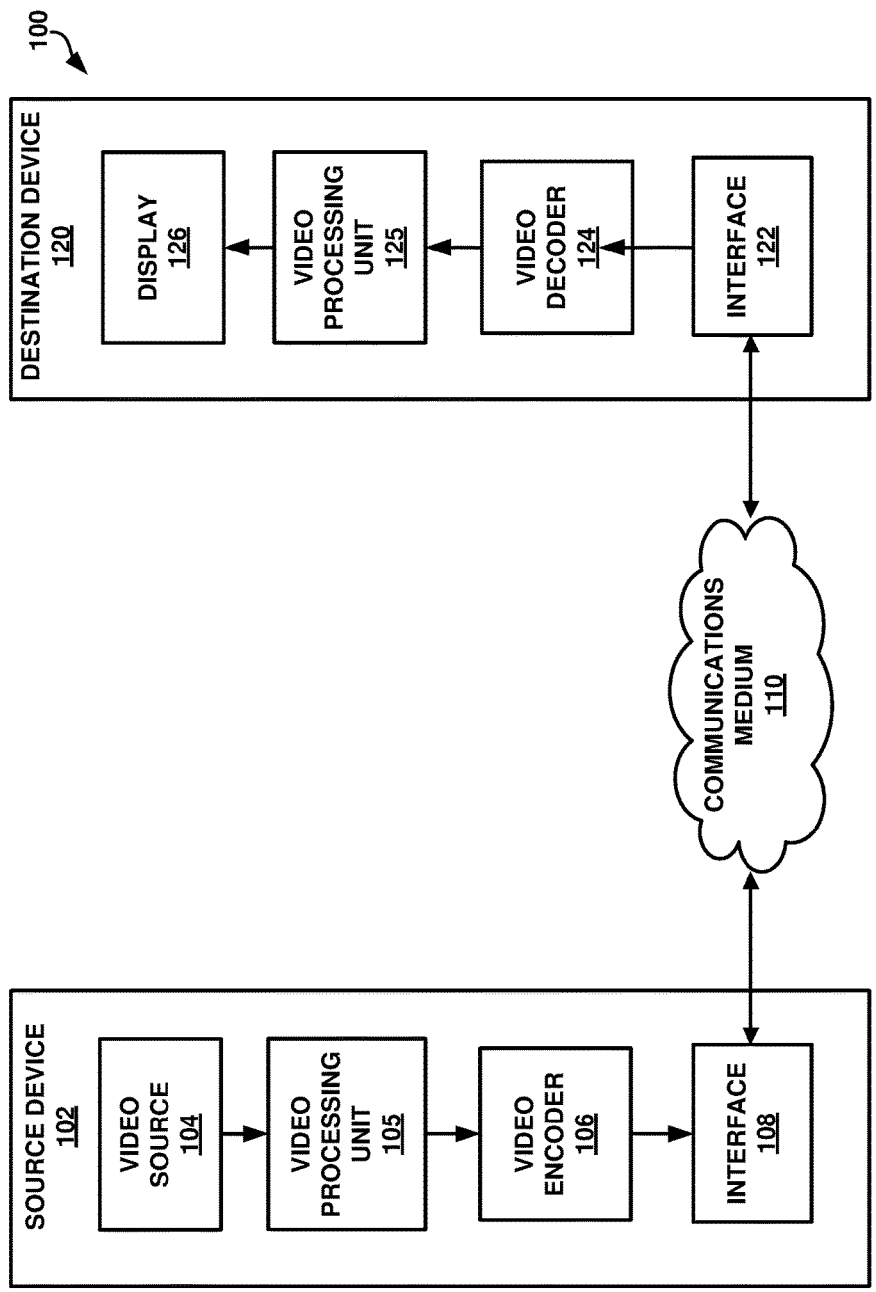
FIG. 3 is a block diagram illustrating an example of a system that may be configured to encode and decode video data according to one or more techniques of this disclosure.

FIG. 3 is a block diagram illustrating an example of a system that may be configured to process and code (i.e., encode and/or decode) video data according to one or more techniques of this disclosure. System 100 represents an example of a system that may mitigate artifacts in temporal scalable video according to one or more techniques of this disclosure. As illustrated in FIG. 3, system 100 includes source device 102, communications medium 110, and destination device 120. In the example illustrated in FIG. 3, source device 102 may include any device configured to process and/or encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, including the so-call ATSC 3.0 suite of standards currently under development, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and IEEE standards.

Storage devices may include any type of device or storage medium capable of storing data. A storage medium may include tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format, such as, for example, a standardized media file format defined by the International Standards Organization (ISO).

Referring again to FIG. 3, source device 102 includes video source 104, video processing unit 105, video encoder 106, and interface 108. Video source 104 may include any device configured to capture and/or store video data. For example, video source 104 may include a video camera and a storage device operably coupled thereto. In one example, video source 104 may include a video capturing device capable of capturing video at any of the frame rates described herein with a shutter interval of 0-100%. Video processing unit 105 may be configured to receive video data from video source and convert received video data into a format that is supported by video encoder 106, e.g., a format that can be encoded. Further, video processing unit 105 may be configured to perform processing techniques in order to optimize video encoding. In some example, these processing techniques may be referred to as pre-processing techniques.

Figure 4:
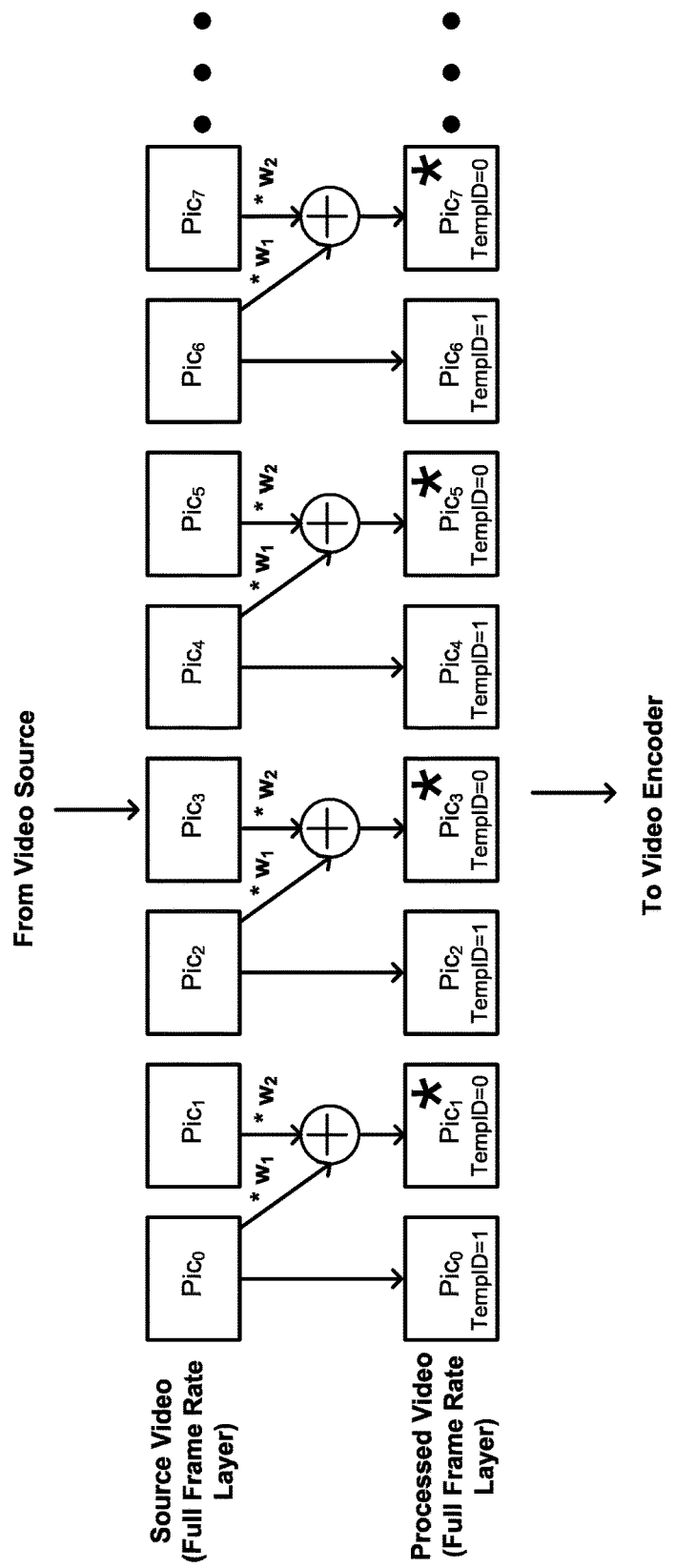
FIG. 4 is a conceptual diagram illustrating an example of processing video data according to one or more techniques of this disclosure.

In one example, video processing unit 105 may be configured to modify a sequence of video data having a particular frame rate in order to improve the quality of a lower frame rate extracted sequence of video data. As described above, conventional temporal scalability techniques may not compensate for non-ideal shutter intervals for each scalable frame rate. FIG. 4 is a conceptual diagram illustrating an example of processing video data according to one or more techniques of this disclosure. Video processing unit 105 may be configured to process video data according to the techniques described with respect to FIG. 4. In one example, the processing techniques described with respect to FIG. 4 may be referred to as multi-shutter processing techniques. In the example illustrated in FIG. 4, video processing unit 105 receives video from a video source (e.g., video source 104) and outputs processed video to a video encoder (e.g., video encoder 106).

In the example illustrated in FIG. 4, source video received from a video source has a full frame rate and processed video output by video processing unit 105 retains the full frame rate. As described above, a video frame rate may include frame rates of 24 Hz, 30 Hz, 40 Hz, 48 Hz, 60 Hz, 120 Hz, 240 Hz, etc. In the example illustrated in FIG. 4, video processing includes replacing every other frame in a source video sequence with a modified frame. As illustrated in FIG. 4, processed video includes even frames $Pic_0$, $Pic_2$, $Pic_4$, and $Pic_6$ from source video and modified frames $Pic_1^*$, $Pic_3^*$, $Pic_5^*$, and $Pic_7^*$. It should be noted that in one example, $Pic_0$, $Pic_2$, $Pic_4$, and $Pic_6$ may be encoded according to the techniques described herein and reconstructed versions thereof may be included in processed video. This may minimize noise when frames $Pic_0$, $Pic_2$, $Pic_4$, and $Pic_6$ are reconstructed by a video decoder (e.g., video decoder 124).

In the example illustrated in FIG. 4, a modified frame is a weighted sum of pixel values of an original video frame and a previous frame. That is:

$$Pic_N^* = (w_2 \times Pic_N) + (w_1 \times Pic_{N-1}),$$

where $w_1$ and $w_2$ are weighting factors (i.e., weighing values) applied to each of the pixel values in a respective frame;

$Pic_N^*$ is the modified frame;

$Pic_N$ is the original frame in the source video sequence; and $Pic_{N-1}$ is the previous frame in the source video sequence.

In one example, the values of $w_1$ and $w_2$ may range from 0.0 to 1.0. In one example, the value of $w_1$ may range from 0.0 to 0.5 and the value of $w_2$ may range from 0.5 to 1.0. In one example, the sum of $w_1$ and $w_2$ may be equal to 1.0 (e.g., $w_2=1-w_1$). In one example, the value of $w_1$ may equal 0.25 and the value of $w_2$ may equal 0.75. In one example, $w_1$ and $w_2$ may be equal (e.g., $w_1=0.5$ and $w_2=0.5$). It should be noted that in some examples, $w_1$ and $w_2$ may vary as a function of regions of a video frame. For example, $w_1$ and $w_2$ may have different values for an edge region of a frame and for a center region of a frame. In one example, a weighted sum of pixel values may include a weighted sum for each component (e.g., Y, Cb, Cr) of respective pixel values. It should be noted that a weighted sum of pixel values may be applied to various pixel representations, for example, RGB with 4:4:4 sampling, YCbCr with 4:4:4 sampling, YCbCr with 4:2:0 sampling. In one example, a weighted sum of pixel values may include a weighted sum of luma components of pixels values. For example, for YCbCr with 4:2:0 sampling a weighted sum may be applied only to luma components. In the case where each pixel includes a 10-bit luma component value and $w_1$ and $w_2$ equal 0.5, the result of the average of a 756 luma component value and an 892 luma component value would be 824. As described in further detail below, the values of weighting factors, $w_1$ and $w_2$, may be communicated to a video decoding device according to one or more techniques in order to reconstruct source video at a video decoding device. Further, information with respect to pixel representation, including particular weighing techniques associated there with may be signaled.

As further illustrated in FIG. 4, in the processed video $Pic_1^*$, $Pic_3^*$, $Pic_5^*$, and $Pic_7^*$ are associated with a first temporal sub-layer (e.g., a base layer) and $Pic_0$, $Pic_2$, $Pic_4$, and $Pic_6$ are associated a second temporal layer (e.g., an enhancement layer). That is, in the example of HEVC, for $Pic_1^*$, $Pic_3^*$, $Pic_5^*$, and $Pic_7^*$ TemporalId equals 0 and for $Pic_0$, $Pic_2$, $Pic_4$, and $Pic_6$ TemporalId equals 1. It should be noted that in other examples, a temporal identifier associated with $Pic_0$, $Pic_2$, $Pic_4$, and $Pic_6$ may include any temporal identifier greater than the temporal identifier associated with $Pic_1^*$, $Pic_3^*$, $Pic_5^*$, and $Pic_7^*$. As described above and in further detail below with respect to FIG. 6, $Pic_1^*$, $Pic_3^*$, $Pic_5^*$, and $Pic_7^*$ may be extracted prior to decoding according to a sub-bitstream extraction process. In this manner, video processing unit 105 represents an example of a device configured to receive video data including a sequence of frames, for every N frame included in the sequence of frames, generate a modified frame, replace every N frame included in the sequence of frames with a corresponding modified frame to generate a modified sequence of frames, and output video data including the modified sequence of frames.

Referring again to FIG. 3, video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard, such as, for example ITU-T H.265 (HEVC), which is described in Rec. ITU-T H.265 v2 (10/2014), and/or extensions thereof. Further, a compliant bitstream may be defined according to a video coding standard currently under development. When generating a compliant bitstream video encoder 106 may compress video data. Compression may be lossy (discernible or indiscernible) or lossless.

As described above, in HEVC, each CTU may include CTB having 16×16, 32×32, or 64×64 luma samples. The CTBs of a CTU may be partitioned into Coding Blocks (CB) according to a corresponding quadtree data structure. According to HEVC, one luma CB together with two corresponding chroma CBs and associated syntax elements is referred to as a coding unit (CU). A CU is associated with a prediction unit (PU) structure defining one or more prediction units (PU) for the CU, where a PU is associated with corresponding reference samples. For example, a PU of a CU may be an array of samples coded according to an intra-prediction mode. Specific intra-prediction mode data (e.g., intra-prediction syntax elements) may associate the PU with corresponding reference samples. In HEVC, a PU may include luma and chroma prediction blocks (PBs) where square PBs are supported for intra-picture prediction and rectangular PBs are supported for inter-picture prediction. The difference between sample values included in a PU and associated reference samples may be referred to as residual data.

Residual data may include respective arrays of difference values corresponding to each component of video data (e.g., luma (Y) and chroma (Cb and Cr)). Residual data may be in the pixel domain. A transform, such as, a discrete cosine transform (DCT), a discrete sine transform (DST), an integer transform, a wavelet transform, lapped transform or a conceptually similar transform, may be applied to pixel difference values to generate transform coefficients. It should be noted that in HEVC, PUs may be further sub-divided into Transform Units (TUs). That is, an array of pixel difference values may be sub-divided for purposes of generating transform coefficients (e.g., four 8×8 transforms may be applied to a 16×16 array of residual values), such sub-divisions may be referred to as Transform Blocks (TBs). Transform coefficients may be quantized according to a quantization parameter (QP). Quantized transform coefficients may be entropy coded according to an entropy encoding technique (e.g., content adaptive variable length coding (CAVLC), context adaptive binary arithmetic coding (CABAC), or probability interval partitioning entropy coding (PIPE)). Further, syntax elements, such as, a syntax element defining a prediction mode, may also be entropy coded. Entropy encoded quantized transform coefficients and corresponding entropy encoded syntax elements may form a compliant bitstream that can be used to reproduce video data.

As described above, prediction syntax elements may associate a video block and PUs thereof with corresponding reference samples. For example, for intra-prediction coding an intra-prediction mode may specify the location of reference samples. In HEVC, possible intra-prediction modes for a luma component include a planar prediction mode (predMode: 0), a DC prediction (predMode: 1), and 33 angular prediction modes (predMode: 2-34). One or more syntax elements may identify one of the 35 intra-prediction modes. For inter-prediction coding, a motion vector (MV) identifies reference samples in a picture other than the picture of a video block to be coded and thereby exploits temporal redundancy in video. For example, a current video block may be predicted from a reference block located in a previously coded frame and a motion vector may be used to indicate the location of the reference block. A motion vector and associated data may describe, for example, a horizontal component of the motion vector, a vertical component of the motion vector, a resolution for the motion vector (e.g., one-quarter pixel precision), a prediction direction and/or a reference picture index value. It should be noted that a reference picture index value may reference a picture in another temporal layer. For example, a frame in a 120 Hz frame rate enhancement sub-layer may reference a frame in a 60 Hz frame rate base layer. Further, a coding standard, such as, for example HEVC, may support motion vector prediction. Motion vector prediction enables a motion vector to be specified using motion vectors of neighboring blocks.

Figure 5:
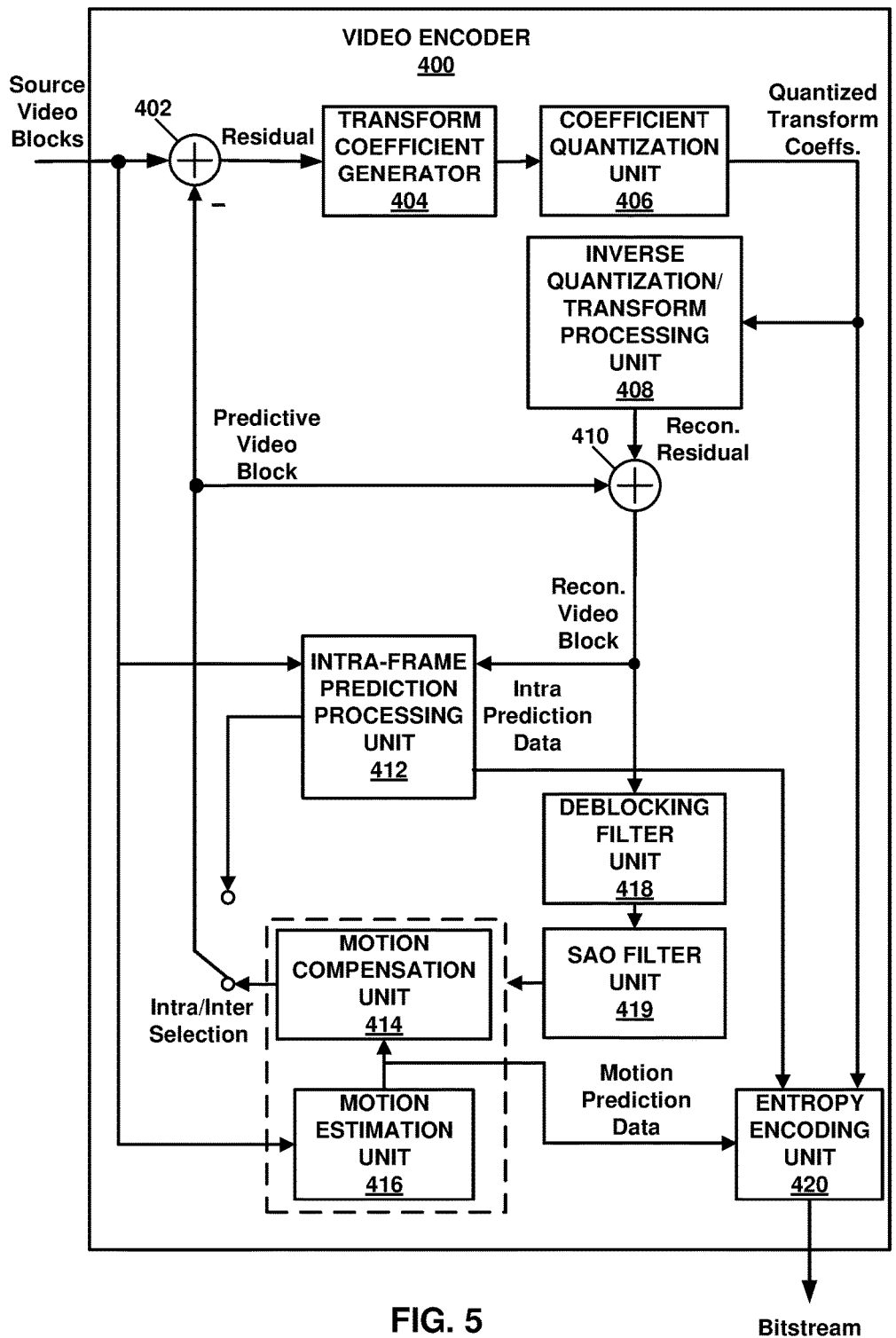
FIG. 5 is a block diagram illustrating an example of a video encoder that may be configured to encode video data according to one or more techniques of this disclosure.

FIG. 5 is a block diagram illustrating an example of a video encoder that may implement the techniques for encoding video data described herein. It should be noted that although example video encoder 400 is illustrated as having distinct functional blocks, such an illustration is for descriptive purposes and does not limit video encoder 400 and/or sub-components thereof to a particular hardware or software architecture. Functions of video encoder 400 may be realized using any combination of hardware, firmware and/or software implementations.

Video encoder 400 may perform intra-prediction coding and inter-prediction coding of video blocks within video slices, and, as such, may be referred to as a hybrid video encoder in some examples. In the example illustrated in FIG. 5, video encoder 400 receives source video blocks that have been divided according to a coding structure. For example, source video data may include macroblocks, CTUs, sub-divisions thereof, and/or another equivalent coding unit. In some examples, video encoder 400 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 400 includes summer 402, transform coefficient generator 404, coefficient quantization unit 406, inverse quantization/transform processing unit 408, summer 410, intra-frame prediction processing unit 412, motion compensation unit 414, motion estimation unit 416, deblocking filter unit 418, sample adaptive offset (SAO) filter unit 419, and entropy encoding unit 420. As illustrated in FIG. 5, video encoder 400 receives source video blocks and outputs a bitstream.

In the example illustrated in FIG. 5, video encoder 400 may generate residual data by subtracting a predictive video block from a source video block. The selection of a predictive video block is described in detail below. Summer 402 represents a component configured to perform this subtraction operation. In one example, the subtraction of video blocks occurs in the pixel domain. Transform coefficient generator 404 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 404 may output residual transform coefficients to coefficient quantization unit 406.

Coefficient quantization unit 406 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). In HEVC, quantization parameters may be updated for each CU and a quantization parameter may be derived for each of luma (Y) and chroma (Cb and Cr) components. Quantized transform coefficients are output to inverse quantization/transform processing unit 408. Inverse quantization/transform processing unit 408 may be configured to apply an inverse quantization and an inverse transformation to generate reconstructed residual data. As illustrated in FIG. 5, at summer 410, reconstructed residual data may be added to a predictive video block. In this manner, an encoded video block may be reconstructed and the resulting reconstructed video block may be used to evaluate the encoding quality for a given prediction, transformation, and/or quantization. Video encoder 400 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra-prediction. Intra-frame prediction processing unit 412 may be configured to select an intra-frame prediction for a video block to be coded. Intra-frame prediction processing unit 412 may be configured to evaluate a frame and determine an intra-prediction mode to use to encode a current block. As described above, possible intra-prediction modes may include a planar prediction mode, a DC prediction mode, and angular prediction modes. Further, it should be noted that in some examples, a prediction mode for a chroma component may be inferred from an intra-prediction mode for a luma prediction mode. Intra-frame prediction processing unit 412 may select an intra-frame prediction mode after performing one or more coding passes. Further, in one example, intra-frame prediction processing unit 412 may select a prediction mode based on a rate-distortion analysis.

Referring again to FIG. 5, motion compensation unit 414 and motion estimation unit 416 may be configured to perform inter-prediction coding for a current video block. It should be noted, that although illustrated as distinct, motion compensation unit 414 and motion estimation unit 416 may be highly integrated. Motion estimation unit 416 may be configured receive source video blocks and calculate a motion vector for PUs of a video block. A motion vector may indicate the displacement of a PU of a video block within a current video frame relative to a predictive block within a reference frame. Inter-prediction coding may use one or more reference frames. Further, motion prediction may be uni-predictive (use one motion vector) or bi-predictive (use two motion vectors). Motion estimation unit 416 may be configured to select a predictive block by calculating a pixel difference determined by, for example, sum of absolute difference (SAD), sum of square difference (SSD), or other difference metrics.

As described above, a motion vector may be determined and specified according to motion vector prediction. Motion estimation unit 416 may be configured to perform motion vector prediction, as described above, as well as other so-called Advance Motion Vector Predictions (AMVP). For example, motion estimation unit 416 may be configured to perform temporal motion vector prediction (TMVP), support "merge" mode, and support "skip" and "direct" motion inference. For example, temporal motion vector prediction (TMVP) may include inheriting a motion vector from a previous frame.

As illustrated in FIG. 5, motion estimation unit 416 may output motion prediction data for a calculated motion vector to motion compensation unit 414 and entropy encoding unit 420. Motion compensation unit 414 may be configured to receive motion prediction data and generate a predictive block using the motion prediction data. For example, upon receiving a motion vector from motion estimation unit 416 for the PU of the current video block, motion compensation unit 414 may locate the corresponding predictive video block within a frame buffer (not shown in FIG. 5). It should be noted that in some examples, motion estimation unit 416 performs motion estimation relative to luma components, and motion compensation unit 414 uses motion vectors calculated based on the luma components for both chroma components and luma components. It should be noted that motion compensation unit 414 may further be configured to apply one or more interpolation filters to a reconstructed residual block to calculate sub-integer pixel values for use in motion estimation.

As illustrated in FIG. 5, motion compensation unit 414 and motion estimation unit 416 may receive reconstructed video block via deblocking filter unit 418 and SAO filtering unit 419. Deblocking filter unit 418 may be configured to perform deblocking techniques. Deblocking refers to the process of smoothing the boundaries of reconstructed video blocks (e.g., make boundaries less perceptible to a viewer). SAO filtering unit 419 may be configured to perform SAO filtering. SAO filtering is a non-linear amplitude mapping that may be used to improve reconstruction by adding an offset to reconstructed video data. SAO filtering is typically applied after applying deblocking.

Referring again to FIG. 5, entropy encoding unit 420 receives quantized transform coefficients and predictive syntax data (i.e., intra-prediction data and motion prediction data). It should be noted that in some examples, coefficient quantization unit 406 may perform a scan of a matrix including quantized transform coefficients before the coefficients are output to entropy encoding unit 420. In other examples, entropy encoding unit 420 may perform a scan. Entropy encoding unit 420 may be configured to perform entropy encoding according to one or more of the techniques described herein. Entropy encoding unit 420 may be configured to output a compliant bitstream, i.e., a bitstream that a video decoder can receive and reproduce video data therefrom.

As described above, syntax elements may be entropy coded according to an entropy encoding technique. To apply CABAC coding to a syntax element, a video encoder may perform binarization on a syntax element. Binarization refers to the process of converting a syntax value into a series of one or more bits. These bits may be referred to as "bins." For example, binarization may include representing the integer value of 5 as 00000101 using an 8-bit fixed length technique or as 11110 using a unary coding technique. Binarization is a lossless process and may include one or a combination of the following coding techniques: fixed length coding, unary coding, truncated unary coding, truncated Rice coding, Golomb coding, k-th order exponential Golomb coding, and Golomb-Rice coding. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example, HEVC. In some examples, the techniques described herein may be generally applicable to bin values generated using any binarization coding technique. After binarization, a CABAC entropy encoder may select a context model. For a particular bin, a context model may be selected from a set of available context models associated with the bin. It should be noted that in HEVC, a context model may be selected based on a previous bin and/or syntax element. A context model may identify the probability of a bin being a particular value. For instance, a context model may indicate a 0.7 probability of coding a 0-valued bin and a 0.3 probability of coding a 1-valued bin. After selecting an available context model, a CABAC entropy encoder may arithmetically code a bin based on the identified context model.

Referring again to FIG. 3, interface 108 may include any device configured to receive a compliant video bitstream and transmit and/or store the compliant video bitstream to a communications medium. Further, interface 108 may include any device configured to transmit and/or store data associated with the compliant video bitstream. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream and data associated with a compliant bitstream to be stored on a storage device. For example, interface 108 may include a chipset supporting PCI and PCIe bus protocols, proprietary bus protocols, Universal Serial Bus (USB) protocols, $I^2C$, or any other logical and physical structure that may be used to interconnect peer devices.

As illustrated in FIG. 3, destination device 120 includes interface 122, video decoder 124, video processing unit 125, and display 126. Interface 122 may include any device configured to receive a compliant video bitstream and associated data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, Universal Serial Bus (USB) protocols, $I^2C$, or any other logical and physical structure that may be used to interconnect peer devices. Video decoder 124 may include any device configured to receive a compliant bitstream and/or acceptable variations thereof and reproduce video data therefrom.

Figure 6:
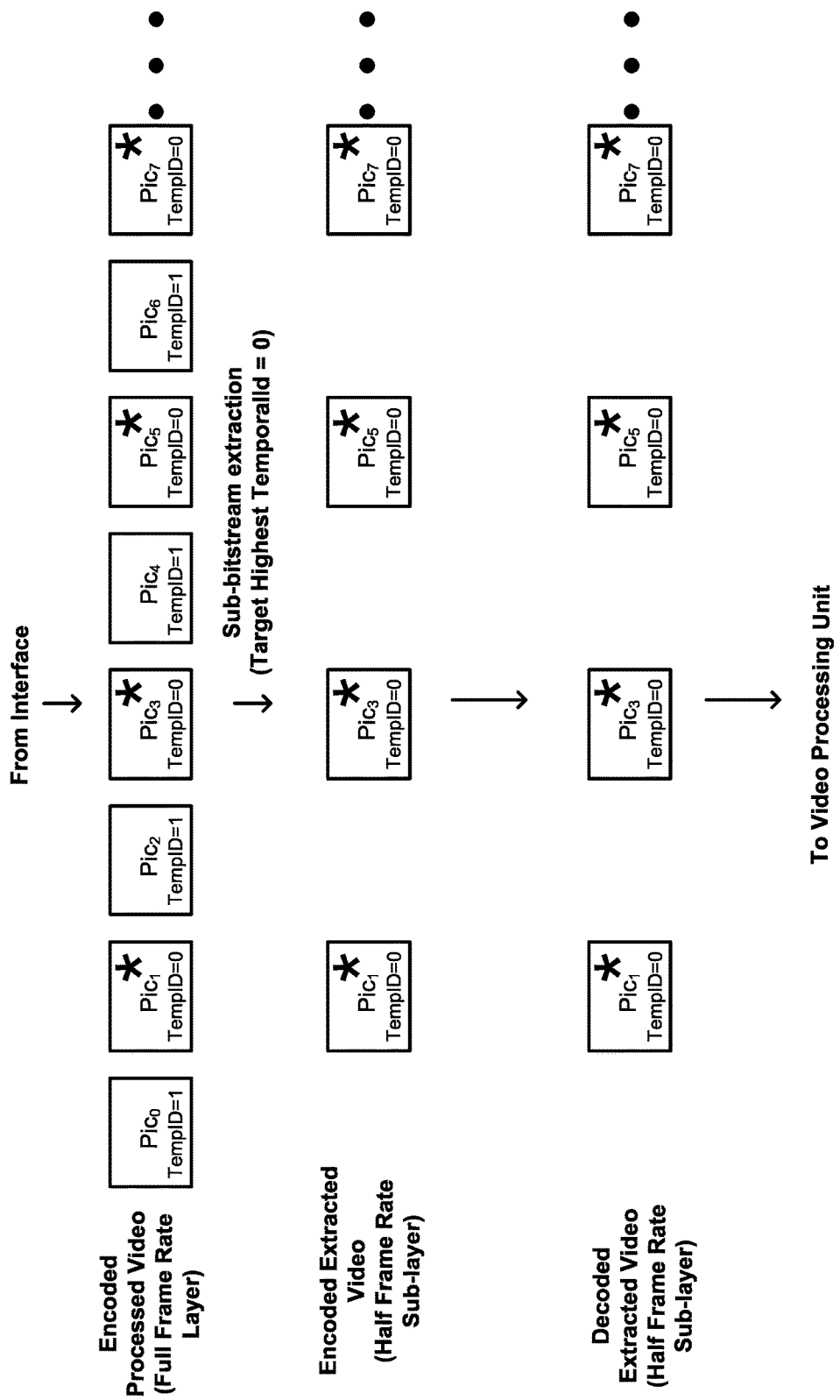
FIG. 6 is a conceptual diagram illustrating an example of a sub-bitstream extraction process according to one or more techniques of this disclosure.

As described above, HEVC defines a sub-bitstream extraction process where NAL units in a bitstream that do not belong to a target set are removed from the bitstream prior to decoding. In one example, Video decoder 124 may be configured to remove frames in a bitstream prior to decoding the frames. FIG. 6 is a conceptual diagram illustrating an example of a sub-bitstream extraction process according to one or more techniques of this disclosure. In the example illustrated in FIG. 6, video decoder 124 receives encoded video data from an interface (e.g., interface 122). In the example illustrated in FIG. 6, the video data includes processed video described with respect to FIG. 4 that has been encoded by a video encoder. As illustrated in FIG. 6, an example encoded layer of video data includes $Pic_1^*$, $Pic_3^*$, $Pic_5^*$, and $Pic_7^*$ associated with a first temporal sub-layer (e.g., TemporalId equals 0) and $Pic_0$, $Pic_2$, $Pic_4$, and $Pic_6$ are associated a second temporal layer (e.g., TemporalId equals 1). In the example illustrated in FIG. 6, a target highest TemporalId of 0 is provided for sub-bitstream extraction and $Pic_1^*$, $Pic_3^*$, $Pic_5^*$, and $Pic_7^*$ are extracted prior to decoding. In this manner, an encoded bitstream of video having a full frame rate (e.g., 240 Hz, 120 Hz, 60 Hz, etc.) is reduced to sub-bitstream of video having a half frame rate (e.g., 120 Hz, 60 Hz, 30 Hz, etc.) prior to decoding. Video decoder 124 decodes the extracted encoded video and outputs the decoded video to a video processing unit (e.g., video processing unit 125). It should be noted that in other examples other fraction frame rate reductions may occur (e.g., ¼, ⅓, ⅔, ¾, etc.).

As described above, a sub-bitstream extraction process may not compensate for non-ideal shutter intervals for each scalable frame rate. However, in the example illustrated in FIG. 6, where extracted frames include video data that has been processed according to one or more of the techniques described herein, for example, the techniques described above with respect to FIG. 4, motion based artifacts may be reduced in a decoded video sequence. Further, as described in detail below in the case where video decoder 124 does not perform sub-bitstream extraction, video processing unit 125 may be configured to reconstruct the source video described above with respect to FIG. 4. As described below, an indication of whether video data includes processed video may be signaled. In this manner, video decoder 124 may determine whether to perform sub-bitstream extraction based on whether an encoded layer of video data associated with a first temporal sub-layer includes modified frames. For example, video decoder 124 may determine that a first temporal sub-layer including modified frames provides a sufficient level of quality, (e.g., compared to a first temporal sub-layer not including modified frames) and may perform sub-bitstream extraction in this case. Further, in some cases, a video decoder may perform sub-bitstream extraction if a first temporal sub-layer includes modified frames, if the video decoder is not able to reconstruct the source video in an efficient manner, capable of reconstructing the source video, or if a display device is not capable of displaying video content at the higher frame rate.

Figure 7:
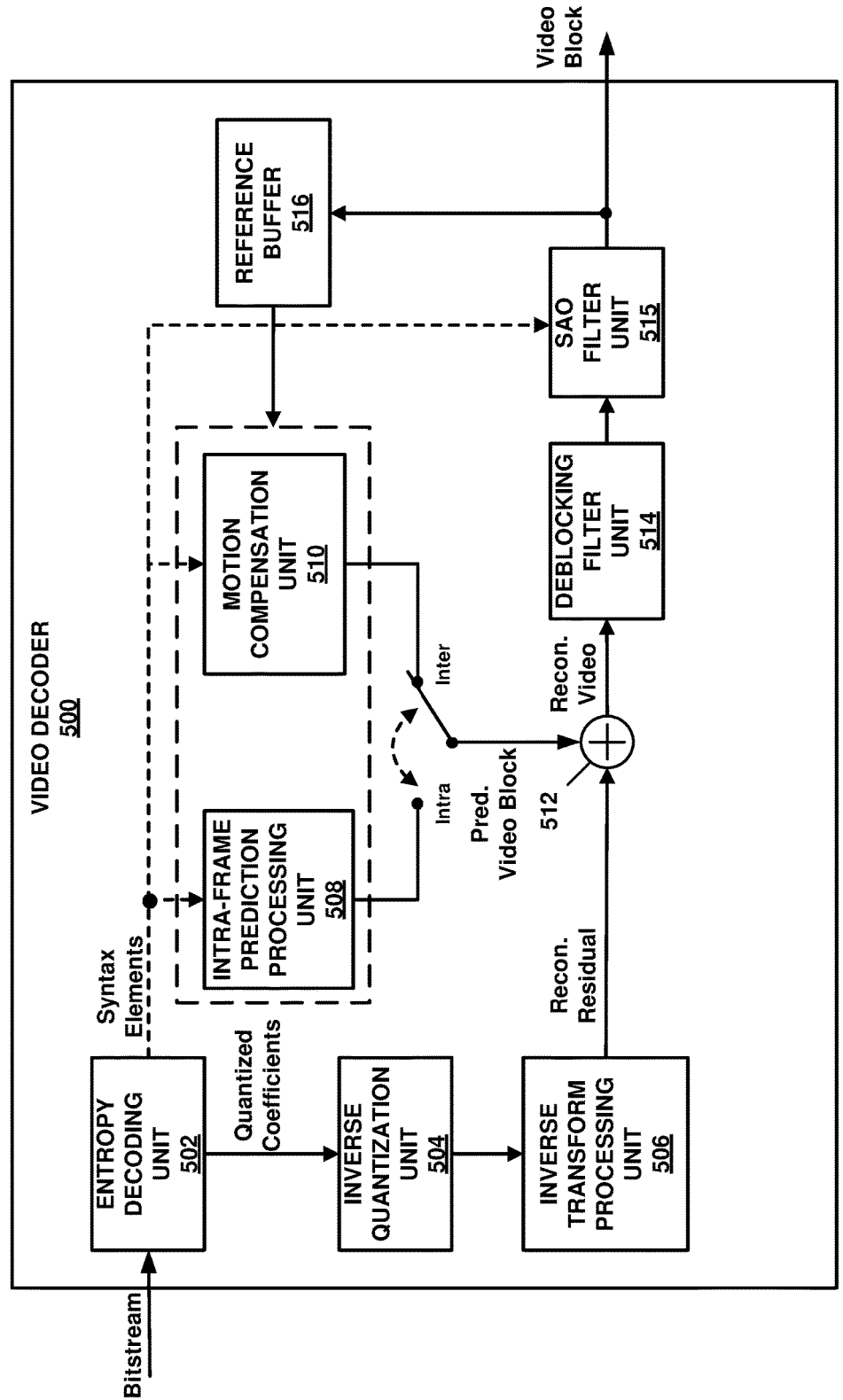
FIG. 7 is a block diagram illustrating an example of a video decoder that may be configured to decode video data according to one or more techniques of this disclosure.

Referring again to FIG. 3, as described above, video decoder 124 is configured to decode a compliant bitstream of video data (including sub-bitstreams). FIG. 7 is a block diagram illustrating an example of a video decoder that may be configured to decode video data according to one or more techniques of this disclosure. Video decoder 500 may be configured to perform intra-prediction decoding and inter-prediction decoding and, as such, may be referred to as a hybrid decoder. In the example illustrated in FIG. 7 video decoder 500 includes an entropy decoding unit 502, inverse quantization unit 504, inverse transform processing unit 506, intra-frame prediction processing unit 508, motion compensation unit 510, summer 512, deblocking filter unit 514, SAO filter unit 515, and reference buffer 516. Video decoder 500 may be configured to decode video data in a manner consistent with a video coding standard. Video decoder 500 may be configured to receive a bitstream, including variables signaled therein. It should be noted that although example video decoder 500 is illustrated as having distinct functional blocks, such an illustration is for descriptive purposes and does not limit video decoder 500 and/or sub-components thereof to a particular hardware or software architecture. Functions of video decoder 500 may be realized using any combination of hardware, firmware and/or software implementations.

As illustrated in FIG. 5, entropy decoding unit 502 receives an entropy encoded bitstream. Entropy decoding unit 502 may be configured to decode quantized syntax elements and quantized coefficients from the bitstream according to a process reciprocal to an entropy encoding process. Entropy decoding unit 502 may be configured to perform entropy decoding according any of the entropy coding techniques described above. Entropy decoding unit 502 may parse an encoded bitstream in a manner consistent with a video coding standard. As illustrated in FIG. 5, inverse quantization unit 504 receives quantized transform coefficients from entropy decoding unit 502. Inverse quantization unit 504 may be configured to apply an inverse quantization. Inverse transform processing unit 506 may be configured to perform an inverse transformation to generate reconstructed residual data. The techniques respectively performed by inverse quantization unit 504 and inverse transform processing unit 506 may be similar to techniques performed by inverse quantization/transform processing unit 408 described above. As illustrated in FIG. 5, reconstructed residual data may be provided to summer 512. Summer 512 may add reconstructed residual data to a predictive video block and generate reconstructed video data. A predictive video block may be determined according to a predictive video technique (i.e., intra-frame prediction and inter-frame prediction).

Intra-frame prediction processing unit 508 may be configured to receive intra-frame prediction syntax elements and retrieve a predictive video block from reference buffer 516. Reference buffer 516 may include a memory device configured to store one or more frames of video data. Intra-frame prediction syntax elements may identify an intra-prediction mode, such as the intra-prediction modes described above. Motion compensation unit 510 may receive inter-prediction syntax elements and generate motion vectors to identify a prediction block in one or more reference frames stored in reference buffer 516. Motion compensation unit 510 may produce motion compensated blocks, possibly performing interpolation based on interpolation filters. Identifiers for interpolation filters to be used for motion estimation with sub-pixel precision may be included in the syntax elements. Motion compensation unit 510 may use interpolation filters to calculate interpolated values for sub-integer pixels of a reference block. Deblocking filter unit 514 may be configured to perform filtering on reconstructed video data. For example, deblocking filter unit 514 may be configured to perform deblocking, as described above with respect to deblocking filter unit 418. SAO filter unit 515 may be configured to perform filtering on reconstructed video data. For example, SAO filter unit 515 may be configured to perform SAO filtering, as described above with respect to SAO filter unit 419. As illustrated in FIG. 7, a video block may be output by video decoder 500. In this manner, video decoder 500 may be configured to generate reconstructed video data.

Figure 8:
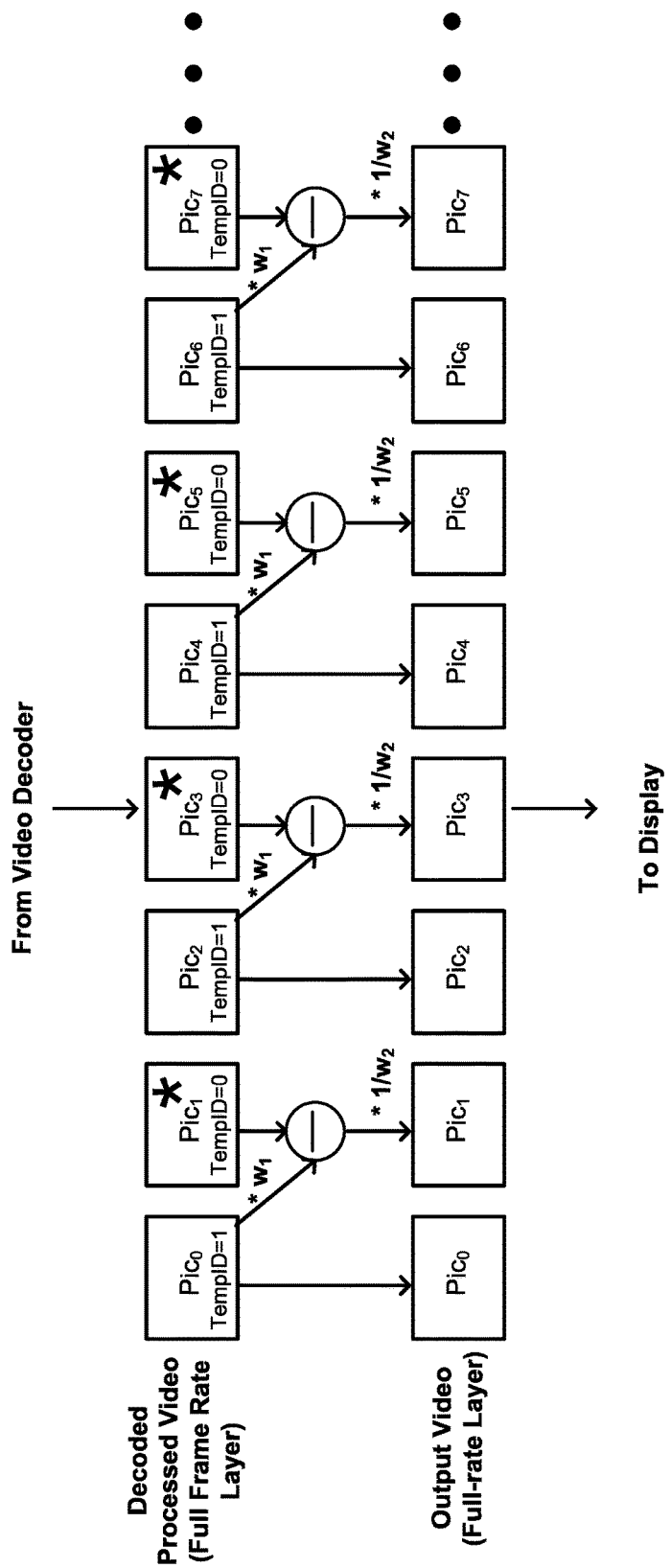
FIG. 8 is a conceptual diagram illustrating an example of processing video data according to one or more techniques of this disclosure.

Referring again to FIG. 3, video processing unit 125 may be configured to receive video data and convert received video data into a format that is supported by display, e.g., a format that can be rendered. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. In one example, display 126 may include a video rendering device capable rendering video data at a rate of 240 Hz or higher. Further, in some examples display 126 may include a video rendering device capable rendering video data at a rate less than 240 Hz (e.g., 60 Hz or 120 Hz). Video processing unit 125 may further be configured to reconstruct the source video according to one or more techniques described herein. FIG. 8 is a conceptual diagram illustrating an example of processing video data according to one or more techniques of this disclosure. Video processing unit 125 may be configured to process video data according to the techniques described with respect to FIG. 8. In the example illustrated in FIG. 8, video processing unit 125 receives video from a video decoder (e.g., video decoder 124) and outputs processed video to a display (e.g., display 126). It should be noted that the video processing unit may output process video data to devices other than display 126 (e.g., storage devices, receiving devices, etc.).

In the example illustrated in FIG. 8, decoded video data has a full frame rate and processed video output by video processing unit 125 retains the full frame rate. In the example illustrated in FIG. 8, video processing includes performing an inverse modification operation on every other frame in a decoded video sequence. As illustrated in FIG. 8, decoded video includes even frames $Pic_0$, $Pic_2$, $Pic_4$, and $Pic_6$ and modified frames $Pic_1^*$, $Pic_3^*$, $Pic_5^*$, and $Pic_7^*$. It should be noted that in the example illustrated in FIG. 8, are inverse modification is not performed on $Pic_0$, $Pic_2$, $Pic_4$, and $Pic_6$. In some examples, a determination of whether to perform an inverse modification may be based on a temporal identifier value. In the example illustrated in FIG. 8, a modified frame is a weighted sum of pixel values of an original video frame and a previous frame. That is, in the example illustrated in FIG. 8, includes a modified frame described above with respect to FIG. 4. In this manner, source video may be reconstructed by performing an inverse modification operation for each of the modified frames. That is:

$$Pic_N = ((Pic_N^*) - (w_1 \times Pic_{N-1}))/w_2,$$

where $w_1$ and $w_2$ are weighting factors applied to each of the pixel values in a respective frame;

$Pic_N^*$ is the modified frame;

$Pic_N$ is the original frame in the source video sequence; and $Pic_{N-1}$ is the previous frame in the decoded video sequence.

It should be noted that in an optimal case, where there is no quantization noise, e.g., due to performing encoding using a limited bit depth, and no coding noise, the original source frames may be completely recovered. It should be noted that in some examples, an inverse modification operation may generate an acceptable variation of an original sources frame. For example, as described in further detail below, the values of weighting factors, $w_1$ and $w_2$, may be communicated to a video decoding device. However, in some cases $w_1$ and $w_2$ may not be available to video processing unit 125. In these cases, video processing unit 125 may be configured to use default values for $w_1$ and $w_2$ and/or derive weight values based on properties of decoded video data. In a similar manner, video processing unit 105 may be configured to derive weight values based on properties of video data. It should be noted that in some examples there may not be a clearly defined relationship for weights (e.g., weights may be derived independently based on video properties). In this manner, video processing unit 125 represents an example of a device configured to receive video data including a sequence of frames, wherein every N frame includes a modified frame, for every N frame included in the sequence of frames, generate a reconstructed frame, replace every N frame included in the sequence of frames with a corresponding reconstructed frame to generate a sequence of frames, and output video data including the sequence of frames.

In one example, $w_1$ and $w_2$ may be communicated to a video decoding device using a mechanism defined in a video coding standard. For example, HEVC includes video usability information (VUI) which may be used to signal color spaces, dynamic ranges, and other video data properties. In HEVC, VUI and other information may be included as part of a supplemental enhancement information (SEI) message. In one example, video usability information, including video usability information and similar structures included in future video coding standards may be used to communicate $w_1$ and $w_2$. Further, HEVC defines a slice header, a sequence parameter set (SPS), a picture parameter set (PPS), and a video parameter set (VPS) structure. In one example, $w_1$ and $w_2$ may be signaled in a slice header, a sequence parameter set (SPS), a picture parameter set (PPS), and a video parameter set (VPS) structure or any other suitable location, including similar structures in future video coding standards.

Referring again to FIG. 3, as described above, communications medium 110 may operate according to the so-call ATSC 3.0 suite of standards currently under development. In this example, source device 102 may include a service distribution engine and destination device 120 may be included as part of a receiver device. Further, in this example source device 102, communications medium 110, and destination device 120 may operate based on a model including one or more abstraction layers, where data at each abstraction layer is represented according to particular structures, e.g., packet structures, modulation schemes, etc. An example of a model including defined abstraction layers is the so-called Open Systems Interconnection (OSI) model illustrated in FIG. 9. The OSI model defines a 7-layer stack model, including an application layer, a presentation layer, a session layer, a transport layer, a network layer, a data link layer, and a physical layer. A physical layer may generally refer to a layer at which electrical signals form digital data. For example, a physical layer may refer to a layer that defines how modulated radio frequency (RF) symbols form a frame of digital data. A data link layer, which may also be referred to as link layer, may refer to an abstraction used prior to physical layer processing at a sending side and after physical layer reception at a receiving side. It should be noted that a sending side and a receiving side are logical roles and a single device may operate as both a sending side in one instance and as a receiving side in another instance. Each of an application layer, a presentation layer, a session layer, a transport layer, and a network layer may define how data is delivered for use by a user application.

The ATSC Candidate Standard: System Discovery and Signaling (Doc. A/321 Part 1), Doc. S32-231r4, 6 May 2015 (hereinafter "A/321"), which is incorporated by reference in its entirety, describes specific proposed aspects of an ATSC 3.0 unidirectional physical layer implementation. Further, a corresponding link layer for the ATSC 3.0 unidirectional physical layer implementation is currently under development. The proposed link layer abstracts various types of data encapsulated in particular packet types (e.g., MPEG-TS packets, IPv4 packets, etc.) into a single generic format for processing by a physical layer. Additionally, the proposed link layer supports segmentation of a single upper layer packet into multiple link layer packets and concatenation of multiple upper layer packets into a single link layer packet. The unidirectional physical layer implementation supports so-called service announcements. It should be noted that service announcements may specifically refer to particular service announcements as defined according to a telecommunications protocol or may more generally refer to a communication between a source device and a destination device.

The proposed ATSC 3.0 suite of standards also support so-called broadband physical layers and data link layers to enable support for hybrid video services. Higher layer protocols may describe how the multiple video services included in a hybrid video service may be synchronized for presentation. It should be noted that although ATSC 3.0 uses the term "broadcast" to refer to a unidirectional over-the-air transmission physical layer, the so-called ATSC 3.0 broadcast physical layer supports video delivery through streaming or file download. As such, the term broadcast as used herein should not be used to limit the manner in which video and associated data may be transported according to one or more techniques of this disclosure.

Referring again to FIG. 9, an example content delivery protocol model is illustrated. In the example illustrated in FIG. 9, content delivery protocol model 900 is "aligned" with the 7-layer OSI model for illustration purposes. It should be noted however that such an illustration should not be construed to limit implementations of the content delivery protocol model 900 or the techniques described herein. Content delivery protocol model 900 may generally correspond to the current content delivery protocol model proposed for the ATSC 3.0 suite of standards. Content delivery protocol model 900 includes two options for supporting streaming and/or file download through ATSC Broadcast Physical layer: (1) MPEG Media Transport Protocol (MMTP) over User Datagram Protocol (UDP) and Internet Protocol (IP) and (2) Real-time Object delivery over Unidirectional Transport (ROUTE) over UDP and IP. MMTP is described in ISO/IEC: ISO/IEC 23008-1, "Information technology-High efficiency coding and media delivery in heterogeneous environments-Part 1: MPEG media transport (MMT)," which is incorporated by reference herein in its entirety. In the case where MMTP is used for streaming video data, video data may be encapsulated in a Media Processing Unit (MPU). MMTP defines a MPU as "a media data item that may be processed by an MMT entity and consumed by the presentation engine independently from other MPUs." A logical grouping of MPUs may form an MMT asset, where MMTP defines an asset as "any multimedia data to be used for building a multimedia presentation. An asset is a logical grouping of MPUs that share the same asset identifier for carrying encoded media data." One or more assets may form a MMT package, where a MMT package is a logical collection of multimedia content.

The ATSC 3.0 suite of standards seeks to support multimedia presentation including multiple video elements including temporal scalable video presentations (e.g., a base frame rate video presentation and enhanced frame rate video presentations). Thus, $w_1$ and $w_2$ may be signaled using data structures described with respect to the ATSC 3.0 suite of standards. As described above, the ATSC 3.0 suite of standard may support service announcements. In one example, service announcements including capability codes for high frame rate (HFR) video (e.g., 120 Hz or greater) content may be defined. In one example capability codes may be defined as provided in Table 1, where example sections A.2.v2 and A.2.v3 including definitions for corresponding capability codes are described below.

TABLE 1

| capability_code | Meaning | Reference |
|---|---|---|
| . . . | . . . | . . . |
| 0x051B | ATSC 3.0 HEVC HFR Video 1 | Section A.2.v2 |
| 0x051C | ATSC 3.0 SHVC HFR Video 1 | Section A.2.v3 |
| . . . | . . . | . . . |

An example of a Section A.2.v2 is provided as follows:
A.2.v2 Capability Code 0x051B: ATSC 3.0 HEVC HFR Video 1
The capability_code value 0x051B shall represent the receiver ability to support HEVC high frame rate video encoded with multi-shutter processing in conformance with the ATSC specification.

Multi-shutter processing may refer to any combination of the processing techniques described herein including, for example, those described with respect to FIG. 4 and FIG. 8.

An example of a Section A.2.v3 is provided as follows:
A.2.v3 Capability Code 0x051C: ATSC 3.0 SHVC HFR Video 1

The capability_code value 0x051B shall represent the receiver ability to support SHVC high frame rate video encoded with multi-shutter processing in conformance with the ATSC specification.

SHVC may refer to scalability extensions (SHVC) defined according to HEVC and/or future variations thereof.

In one example, service signaling of high frame rate video content may be accomplished using various syntax elements. Table 2 and Table 3 below provide various elements and semantics that may be used to signal high frame rate video content.

TABLE 2

| Syntax | No. of Bits | Format |
|---|---|---|
| video_signaling( ) { | | |
| ... | | |
| hfr_info_present | 1 | bslbf |
| ... | | |
| if(hfr_info_present) { | | |
| hfr_info( ) | 8 | Table 3 or Table 4 |
| } | | |
| ... | | |
| } | | |

In Table 2, bslbf refers to bit string left bit first data type. In one example, hfr_info_present syntax element included in Table 2 may be based on the following example definition:

hfr_info_present—This 1-bit Boolean flag shall indicate, when set to '1', that the elements in hfr_info( ) structure are present. When set to '0', the flag shall indicate that the elements in hfr_info( ) structure are not present.

As illustrated in Table 2, an example of hfr_info( ) semantics is provided in Table 3.

TABLE 3

| Syntax | No. of Bits | Format |
|---|---|---|
| hfr_info( ) { | | |
| multishutter_indicator | 1 | bslbf |
| if(multishutter_indicator) { | | |
| num_weights_minus2 | 1 | uimsbf |
| for( i = 0; i < num_weights_minus2+2; i++) { | | |
| ms_weight[ i ] | 2 | uimsbf |
| } | | |
| reserved | 8 − 2 * (num_weights_minus2 + 3) | '11..' |
| } | | |
| else { | | |
| reserved7 | 7 | '1111111' |
| } | | |
| } | | |

In Table 3, uimsbf refers to an unsigned integer most significant bit first data type and bslbf refers to bit string left bit first data type. In one example, hfr_info_present multishutter_indicator, num_weights_minus2, and ms_weight syntax elements included in Table 3 may be based on the following example definitions:

multishutter_indicator—When set to '1' shall indicate that video frames at the second highest temporal sub-layer are processed via multi-shutter processing. When set to '0' shall indicate that video frames at the second highest temporal sub-layer are not processed via multi-shutter processing.

num_weights_minus2—plus 2 specifies the number of weights signalled for multi-shutter processing of video frames at the second highest temporal sub-layer.

ms_weight[i]—specifies the multi-shutter weight applied to the temporally preceding (i-1)'th original video frame. The weight values are as follows: '00'=0.25, '01'=0.5, '10'=0.75, '11'=1.0. It may be a requirement that sum of ms_weight[i] values for i in the range of 0 to (num_weights_minus2+1), inclusive, shall be equal to 1.0.

It should be noted that based on the example definitions of multishutter_indicator, num_weights_minus2, and ms_weight, two (e.g., $w_1$ and $w_2$) or three weighing values may be signalled, where possible weight values include values of 0.25, 0.5, 0.75, and 1.0. It should be noted that in other examples other numbers of weight values may be signalled and/or other possible weight values may be used. For example, in one example ms_weight may be based on the following example definition:

ms_weight[i]—specifies the multi-shutter weight applied to the temporally preceding i'th original video frame. The weight values are as follows: '00'=1.0, '01'=0.8, '10'=0.667, '11'=0.5.

Further ms_weight[num_weight_minus2+1] may be calculated as:

$$\text{ms\_weight}[\text{num\_weights\_minus2} + 1] = 1.0 - \sum_{i=0}^{i=num\_weights\_minus2} \text{ms\_weight}[i]$$

In another example, ms_weight may be based on the following example definition:

ms_weight[i]—specifies the multi-shutter weight applied to the temporally preceding i'th received video frame. The weight values are as follows: '00'=1.0, '01'=0.8, '10'=0.667, '11'=0.5 . . . .

Further, in should be noted that $w_1$ and $w_2$ or other weight values used in an averaging operation may be derived from signalled weight values. That is, a function having signalled weight values as input may be used to generate $w_1$ and $w_2$. In one example, the function may be based on properties of video data.

As illustrated in Table 2, an example of hfr_info( ) semantics is provided in Table 4.

TABLE 4

| Syntax | No. of Bits | Format |
|---|---|---|
| hfr_info( ) { | | |
|    multishutter_indicator | 1 | bslbf |
|    if(multishutter_indicator) { | | |
|      msweight | 2 | uimsbf |
|      reserved | 5 | '11..' |
|    } | | |
|    else { | | |
|      reserved7 | 7 | '1111111' |
|    } | | |
| } | | |

In Table 4, uimsbf refers to an unsigned integer most significant bit first data type and bslbf refers to bit string left bit first data type. In one example, syntax elements multishutter_indicator and ms_weight included in Table 4 may be based on the following example definitions:

multishutter_indicator—When set to '1' shall indicate that video frames at highest temporal sub-layer are processed via multi-shutter processing. When set to '0' shall indicate that video frames at highest temporal sub-layer are not processed via multi-shutter processing.

msweight—specifies the multi-shutter weight applied to the current original video frame. The weight values are as follows: '00'=1.0, '01'=0.8, '10'=0.667, '11'=0.5. The multi-shutter weight applied to the temporally preceding original video frame is calculated as (1.0—msweight).

Further in another example, more than 2 bits may be used to signal msweight syntax element to signal more candidate weight values. For example, 3 bits may be used instead of 2 bits for the syntax element msweight.

In another example, msweight may be based on the following example definition:

msweight—specifies the multi-shutter weight applied to the temporally preceding received video frame and received video frame. The weight values are defined as in Table A.

Examples of a Table A associated with the example definition of msweight are provided in Table 5 and Table 6 below:

TABLE 5

| msweight | $w_2/w_1$ | $1/w_1$ |
|---|---|---|
| '00' | 0.25 | 1.25 |
| '01' | 0.5 | 1.5 |
| '10' | 0.75 | 1.75 |
| '11' | 1 | 2 |

TABLE 6

| msweight | $w_2/w_1$ | $1/w_1$ |
|---|---|---|
| '00' | 0 | 1 |
| '01' | 0.25 | 1.25 |
| '10' | 0.5 | 1.5 |
| '11' | 0.75 | 1.75 |

Figure 9:
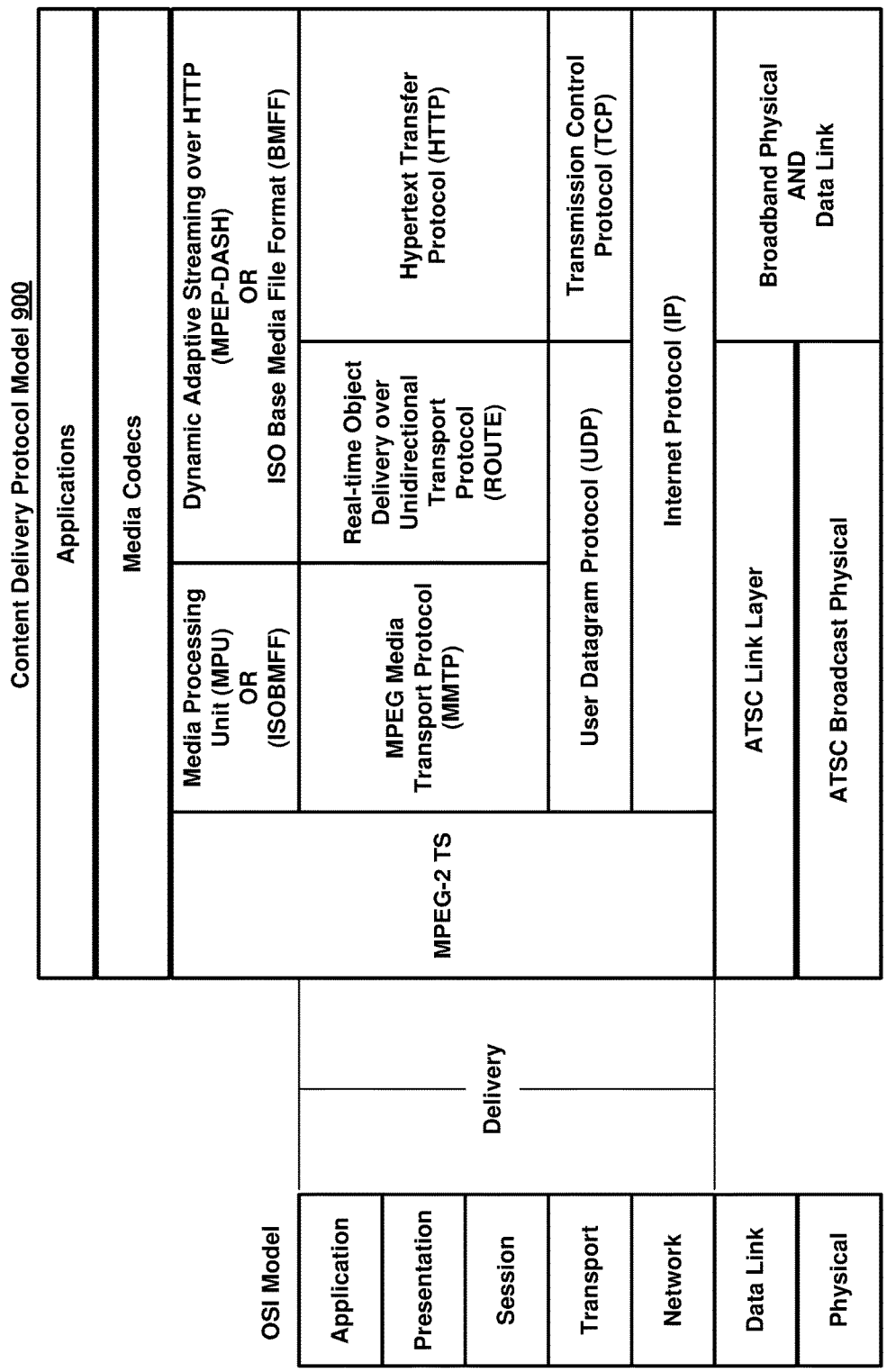
FIG. 9 is a conceptual diagram illustrating an example of content delivery protocol model according to one or more techniques of this disclosure.

As illustrated in FIG. 9, the ATSC 3.0 suite of standards may support Dynamic Adaptive Streaming over HTTP (DASH) protocol. In one example, weight values may be signalled using DASH signalling mechanisms, including, for example, those under development by the DASH Industry Forum (DASH-IF). Further, in one example, in order to support signalling common to MMT and DASH, syntax elements include in hfr_info( ) may be encapsulated in a SEI message. In this manner, source device represents an example of a device configured to signal a first weight value and a second weight value as part of a service announcement. It should be noted that although the example signaling of weight values is described with respect to ATSC, the techniques for signalling weight values described herein may be generally applicable to other telecommunications protocols include DVB standards, ISDB standards, Association of Radio Industries and Businesses (ARIB) standards, etc.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device (the video decoder and the video encoder) used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

What is claimed is:

1. A method of generating a bitstream including video data having multiple temporal layers, the method comprising:
receiving video data including a sequence of frames having a frame rate of 2*N;
for every other frame included in the sequence of frames, generating a respective modified frame by performing a pixel averaging operation using the frame and its respective previous frame in the video sequence, where the pixel averaging operation includes applying a first weight value to the previous frame and applying a second weight value to the frame and adding the weighed pixel values of the previous frame and the frame;
replacing every other frame included in the sequence of frames with a corresponding generated modified frame to generate a modified sequence of frames having a frame rate of 2*N;
associating each of the generated modified frames within the generated modified sequence of frames with a temporal sub-layer having a frame rate of N;
encoding the generated modified sequence of frames to generate a bitstream of video data; and
outputting the bitstream of video data.

2. The method of claim 1, wherein the sequence of frames has a frame rate of 120 Hz.

3. The method of claim 1, wherein the sum of the first weight value and the second weight value equals one.

4. The method of claim 3, further comprising signaling the first weight value and the second weight value.

5. The method of claim 4, wherein signaling the first weight value and the second weight value includes signaling the first weight value and the second weight value as part of a service announcement.

6. A method of reconstructing video data from a bitstream including video data having multiple temporal layers, the method comprising:
receiving a bitstream of video data including a sequence of frames having a frame rate of 2*N and wherein every other frame is associated with a temporal sub-layer having a frame rate of N;
for every other frame included in the sequence of frames, generating a reconstructed frame by performing an inverse pixel averaging operation using the frame and its respective previous frame in the video sequence, where the inverse pixel averaging operation includes applying a first weight value to the previous frame, subtracting weighted previous frame from the frame, and dividing the resulting difference value by a second weight value;
replacing every other frame included in the sequence of frames with a corresponding reconstructed frame to generate a sequence of frames having a frame rate of 2*N.

7. The method of claim 6, wherein the sum of the first weight value and the second weight value equals one.

8. A device for reconstructing video data from a bitstream including video data having multiple temporal layers, the device comprising one or more processors configured to:
receive a bitstream of video data including a sequence of frames having a frame rate of 2*N and wherein every other frame is associated with a with a temporal sub-layer having a frame rate of N;
for every other frame included in the sequence of frames, generating a reconstructed frame by performing an inverse pixel averaging operation using the frame and its respective previous frame in the video sequence, where the inverse pixel averaging operation includes applying a first weight value to the previous frame, subtracting weighted previous frame from the frame, and dividing the resulting difference value by a second weight value;
replacing every other frame included in the sequence of frames with a corresponding reconstructed frame to generate a sequence of frames having a frame rate of 2*N.

9. The device of claim 8, wherein the sum of the first weight value and the second weight value equals one.

10. The device of claim 9, wherein the second weight value is determined as having one of the following values: 1/1.25, 1/1.5, 1/1.75, and ½.

11. The method of claim 3, wherein the second weight has a value of 1/1.25.

12. The method of claim 3, wherein the second weight has a value of 1/1.5.

13. The method of claim 3, wherein the second weight has a value of 1/1.75.

14. The method of claim 3, wherein the second weight has a value of ½.

15. The method of claim 4, wherein signaling the first weight value and the second weight value include signaling the first weight and the second weight as a two-bit value.

16. The method of claim 15, wherein a two-bit value of '11' indicates that the first weight has a value of 0.5.

17. The method of claim 6, wherein the sequence of frames has a frame rate of 120 Hz.

18. The method of claim 7, further comprising determining that the second weight has a value of 1/1.25.

19. The method of claim 7, further comprising determining that the second weight has a value of 1/1.5.

20. The device of claim 9, wherein the sequence of frames has a frame rate of 120 Hz.

* * * * *